US010318176B2

(12) United States Patent
Vansteenkiste et al.

(10) Patent No.: US 10,318,176 B2
(45) Date of Patent: Jun. 11, 2019

(54) REAL-TIME, SELF-LEARNING AUTOMATED OBJECT CLASSIFICATION AND STORAGE TIER ASSIGNMENT

(71) Applicant: Western Digital Technologies, Inc., San Jose, CA (US)

(72) Inventors: Arne Vansteenkiste, Gentbrugge (BE); Pieter Audenaert, Zele (BE); Wim Michel Marcel De Wispelaere, Ghent (BE)

(73) Assignee: Western Digital Technologies, San Jose, CA (US)

( * ) Notice: Subject to any disclaimer, the term of this patent is extended or adjusted under 35 U.S.C. 154(b) by 36 days.

(21) Appl. No.: 15/697,304

(22) Filed: Sep. 6, 2017

(65) Prior Publication Data
US 2019/0073137 A1 Mar. 7, 2019

(51) Int. Cl.
| | | |
|---|---|---|
| *G06F 12/00* | (2006.01) | |
| *G06F 13/00* | (2006.01) | |
| *G06F 3/06* | (2006.01) | |
| *G06K 9/62* | (2006.01) | |
| *G11B 27/36* | (2006.01) | |

(52) U.S. Cl.
CPC .......... *G06F 3/0611* (2013.01); *G06F 3/0629* (2013.01); *G06K 9/6277* (2013.01); *G11B 27/36* (2013.01)

(58) Field of Classification Search
None
See application file for complete search history.

(56) References Cited

U.S. PATENT DOCUMENTS

| | | | |
|---|---|---|---|
| 5,893,139 A | 4/1999 | Kamiyama | |
| 9,330,197 B2* | 5/2016 | Wilson | G06Q 10/00 |
| 2003/0145186 A1 | 7/2003 | Szendy et al. | |
| 2005/0204113 A1* | 9/2005 | Harper | G06F 13/1668 |
| | | | 711/170 |
| 2005/0268037 A1* | 12/2005 | Hama | G06F 11/3452 |
| | | | 711/118 |
| 2010/0235569 A1 | 9/2010 | Nishimoto et al. | |
| 2012/0117329 A1* | 5/2012 | Anderson | G06F 12/123 |
| | | | 711/136 |

(Continued)

*Primary Examiner* — Sean D Rossiter
(74) *Attorney, Agent, or Firm* — Patent Law Works LLP (57) ABSTRACT

Multiple objects in a multi-tiered storage system are classified according to multiple metadata fields. Access histories of the classified objects are tracked. Tracked access histories for objects having given values for given metadata fields are amalgamated. Access probability distributions are determined for objects having given values for given metadata fields, based on the amalgamated access histories. Responsive to a new object being added to the system, the new object is classified according to multiple metadata fields. For each specific one of the multiple metadata fields according to which the new object is classified, the determined access probability distribution for objects having the same metadata classification value as the new object is retrieved. The predicted access probability distribution for the new object is determined, by combining the retrieved access probability distributions. The new object is assigned to and stored in a specific storage tier based on the predicted access probability distribution.

20 Claims, 7 Drawing Sheets

(56) References Cited

U.S. PATENT DOCUMENTS

| | | | |
|---|---|---|---|
| 2014/0013027 A1* | 1/2014 | Jannyavula Venkata ................... G06F 12/0866 711/103 |
| 2014/0013052 A1* | 1/2014 | Sawin ................. G06F 12/0862 711/122 |
| 2014/0095929 A1 | 4/2014 | Chan et al. |
| 2015/0149267 A1* | 5/2015 | Thakker ............. G06Q 30/0207 705/14.16 |
| 2015/0205714 A1 | 7/2015 | Greenfield et al. |
| 2015/0212754 A1* | 7/2015 | Kasper .................. G06F 3/0619 711/114 |
| 2015/0261462 A1* | 9/2015 | Miwa .................... G06F 3/0653 711/114 |
| 2016/0062916 A1* | 3/2016 | Das ....................... G06F 12/128 711/133 |
| 2016/0381176 A1* | 12/2016 | Cherubini ............. H04L 67/327 709/219 |
| 2017/0344546 A1* | 11/2017 | Nam ......................... G06F 9/48 |
| 2018/0276134 A1* | 9/2018 | Cherubini ........... G06F 12/0888 |

\* cited by examiner

REAL-TIME, SELF-LEARNING AUTOMATED OBJECT CLASSIFICATION AND STORAGE TIER ASSIGNMENT

TECHNICAL FIELD

The present disclosure pertains generally to storage and retrieval of digital data, and more specifically to real-time, self-learning automated object classification and storage tier assignment in a large scale distributed object storage environment.

BACKGROUND

The rise in electronic and digital device technology has rapidly changed the way society communicates, interacts, and consumes goods and services. Modern computing devices, such as desktop computers, rack mounted computers, laptops, smart phones, tablets and wearable computing devices allow organizations and users to have access to a variety of useful applications in many locations. Using such applications results in the generation of a large amount of data. Storing and retrieving the produced data is a significant challenge associated with providing useful applications and devices.

The data generated by online services and other applications can be stored at data storage facilities. As the amount of data grows, having a plurality of users sending and requesting data can result in complications that reduce efficiency and speed. Proper classification, assignment of storage tier, and quick access time of objects in storage systems would be desirable for good performance.

SUMMARY

Multiple objects in a multi-tiered storage system are classified according to multiple fields of metadata concerning the objects. For example, objects can be classified according to metadata fields such as the identity (e.g., user name, IP address) of users who add objects to the storage system, those who access existing objects, object size, object name, parsed components of full path name, etc. Access histories of the classified objects are tracked. For example, for each specific classified object, the time at which the specific classified object was initially added to the multi-tiered storage system, and the time at which the specific classified object was last accessed, can be maintained. Thus, times between accesses of specific classified object can be tracked, as well as total object lifetimes. Objects can be classified and tracked starting at the time at which they are initially added to the multi-tiered storage system. It is also possible to start the classification and tracking process on objects already present in the system.

Tracked access histories are amalgamated for objects having given values for given metadata fields. Thus, access histories for all objects having the same value for a specific metadata field are amalgamated. More specifically, tracked access activity for multiple objects having the same specific value for a specific metadata field can be amalgamated, for example in a corresponding logarithmic bin. Responsive to an access event targeting an object having a specific value for a given specific metadata field, the corresponding amalgamated tracked access history is updated to account for the access event. Access probability distributions are determined for objects having given values for given metadata fields, based on the amalgamated access histories. In some embodiments, this can take the form of maintaining multiple probability distribution tables, each separate maintained probability distribution table tracking access events for each classified object having the same specific value for the specific metadata field. Where an access event targets an object having a specific value for a given specific metadata field, the corresponding maintained probability distribution table is updated to account for the access event.

Responsive to a new object being added to the multi-tiered storage system, the new object is classified according to multiple fields of metadata. For each specific one of the multiple metadata fields according to which the new object is classified, the determined access probability distribution for objects having the same metadata classification value as the new object is retrieved. The predicted access probability distribution for the new object is determined, by combining the retrieved access probability distributions. In some embodiments, the predicted access probability distribution for the new object is determined by calculating the point-wise product of all retrieved access probability distributions, and treating the calculated point-wise product as the predicted access probability distribution for the new object. The new object is assigned to and stored in a specific storage tier (e.g., faster solid state storage or slower electromechanical storage) based on the predicted access probability distribution. For example the new object can be assigned to a specific storage tier based on one or more statistical quantifiers of the predicted access probability distribution (e.g., mean, median, quantiles, etc.). More specifically, in one embodiment if the storage system comprises, e.g., 10% flash storage and 90% hard disk storage, those objects in the top 10% predicted access frequency could be assigned to and stored on flash, with the remaining 90% assigned to and stored on hard disks.

Other aspects include corresponding methods, systems, apparatus, and computer program products for these and other innovative aspects.

Note that the above list of features is not all-inclusive and many additional features and advantages are contemplated and fall within the scope of the present disclosure. Moreover, the language used in the present disclosure has been principally selected for readability and instructional purposes, and not to limit the scope of the subject matter disclosed herein.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The present disclosure describes technology, which may include methods, systems, apparatuses, computer program products, and other implementations, for real-time, self-learning automated object classification and storage tier assignment in a large scale distributed object storage environment. In the following description, for purposes of explanation, numerous specific details are set forth to provide a thorough understanding of the various aspects of different example embodiments. Note that any particular example embodiment may in various cases be practiced without all of the specific details and/or with variations, permutations, and combinations of the various features and elements described herein.

A self-learning classification manager 101 automatically classifies objects according to different metadata fields, and tracks access activity concerning the objects. Historical access object activity is amalgamated per metadata field. Access frequency and lifetime of new objects can be automatically predicted based on their metadata fields and historical tracked access information for objects with the same or similar classifications. Based on predicted access frequency and lifetime expectancy, objects can then be assigned to the storage tier that best addresses their performance requirements. Objects predicted to be subject to the most frequent access can be stored on a faster tier (e.g., flash storage) whereas those predicted to have less frequent access can be stored on a slower tier (e.g., mechanical hard drive storage). Faster storage is more expensive and typically significantly less plentiful in a tiered storage system, so only a minority of the objects can be stored thereon. The classification and assignment functionality described herein is fully self-learning, does not require human input, does not require prior knowledge, and can work in a large-scale distributed environment.

By proactively assigning new objects to the appropriate storage tier, access times of the most frequently accessed objects is greatly improved. In addition, migrating of objects between storage tiers is greatly reduced, thereby saving the performance and computational overhead associated with such migrations. The proactive classification and assignment of objects to the appropriate storage tier also reduces write wear on solid state storage devices by not writing unnecessary data. Proactive classifications can also be used to store related or equivalent objects in close proximity, thereby reducing the latency for accessing those objects in sequence. Storing related objects in close proximity can also facilitate compaction and space reclaim after those related objects have been deleted. The self-learning classification manager 101 only requires minimal CPU and memory, using only spare CPU capacity that is typically already present in the system, without driving up the cost.

Figure 1:
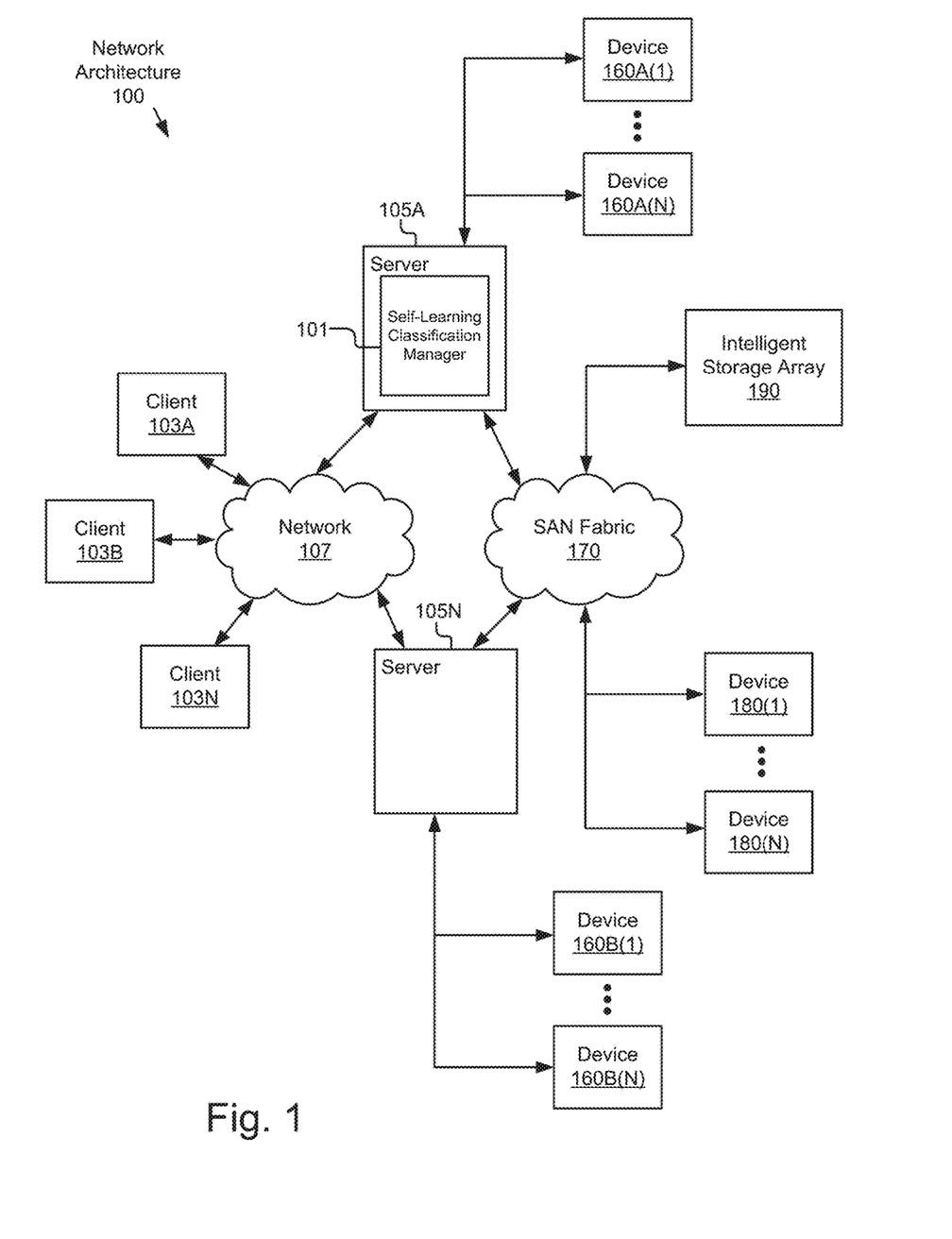
FIG. 1 is a block diagram of an exemplary network architecture in which a self-learning classification manager can be implemented, according to some embodiments.
Figure 3:
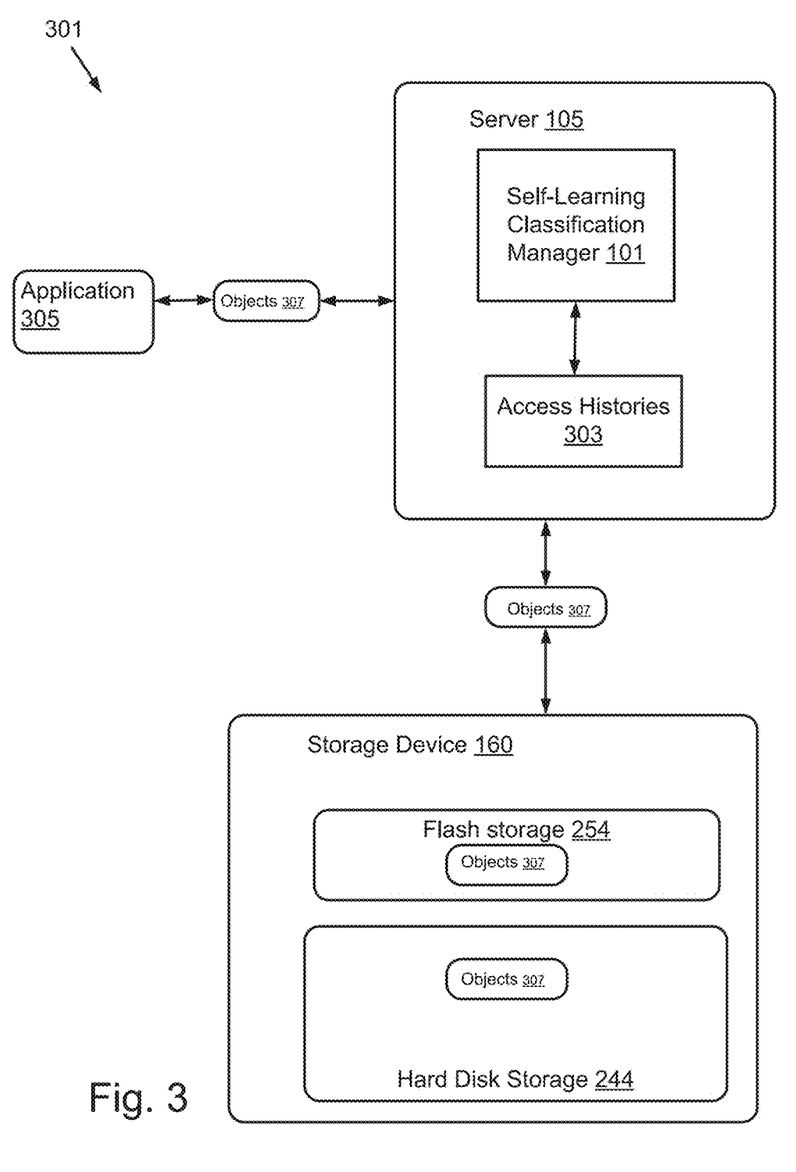
FIG. 3 is a block diagram of the operation of a self-learning classification manager, according to one embodiment.
Figure 4:
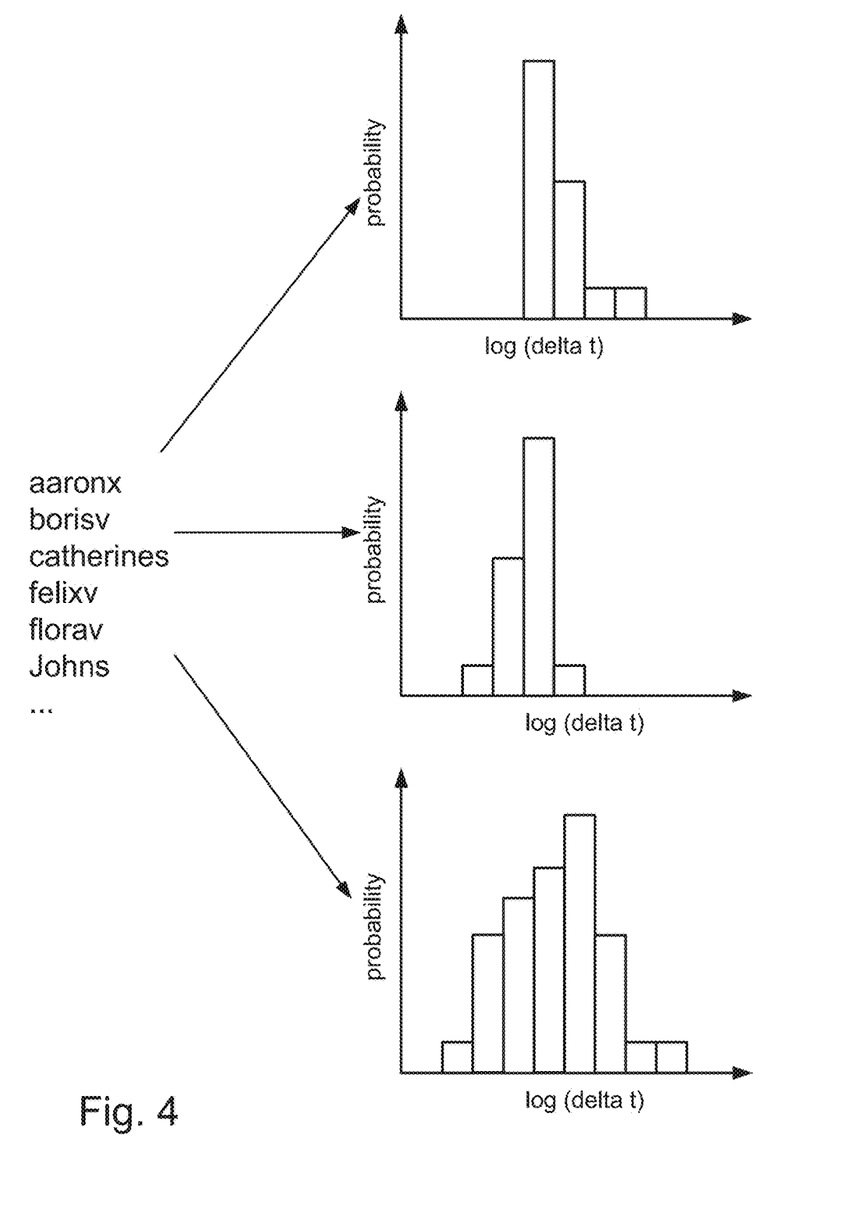
FIGS. 4-6 illustrate access histories corresponding to specific metadata fields, according to different embodiments.

FIG. 1 is a block diagram illustrating an exemplary network architecture 100 in which a self-learning classification manager 101 can be implemented. In the illustrated network architecture 100, client systems 103A, 103B and 103N, as well as servers 105A and 105N, are communicatively coupled to a network 107. A self-learning classification manager 101 is illustrated as residing on server 105A, but in other embodiments the self-learning classification manager 101 can reside on more, fewer or different computers 210 as desired. In FIG. 1, server 105A is further depicted as having storage devices 160A(1)-(N) directly attached, and server 105N is depicted with storage devices 160B(1)-(N) directly attached. As an example of another possible storage architecture according to some embodiments, servers 105A and 105N are depicted as also being connected to a SAN fabric 170 which supports access to storage devices 180(1)-(N) by servers 105A and 105N, and so by client systems 103A-N via network 107. Intelligent storage array 190 is also shown as an example of a specific storage device accessible via SAN fabric 170. It is to be understood that the embodiment described in conjunction with FIG. 3-4 is directed to object storage. SAN 170 is shown in FIG. 1 only as an example of another possible architecture to which the self-learning classification manager 101 might be applied in another embodiment. In yet other embodiments, shared storage can be implemented using FC and iSCSI (not illustrated) instead of a SAN fabric 170. It is to be understood that storage devices 160A(1)-(N), 160B(1)-(N) and 180(1)-(N), as well as SAN fabric 170 and intelligent storage array 190 are just examples of possible architectures according to some embodiments. Other storage architectures and configurations can be used in other embodiments. As described in more detail below, storage components can comprise larger amounts of slower storage (e.g., electromechanical storage such as hard disks) in combination with smaller amounts of faster storage (e.g., solid state storage such as flash memory). Solid state storage has significantly faster access times than the electromechanical storage, and thus can be used as a high speed cache.

Many different networking technologies can be used to provide connectivity from each of client computer systems 103A-N to network 107. Some examples include: LAN, WAN and various wireless technologies. Client systems 103A-N are able to access applications and/or data on server 105A or 105N using, for example, a web browser or other client software (not shown). This enables client systems 103A-N to run applications from an application server 105 and/or to access data hosted by a storage server 105 or one of storage devices 160A(1)-(N), 160B(1)-(N), 180(1)-(N) or intelligent storage array 190. It is to be understood that in practice, the number of servers 105 and storage devices 160 may be orders of magnitude greater than what is depicted in FIG. 1. For example, the self-learning classification manager 101 can target a large storage rack consisting of a dozen or more servers 105, hundreds of hard disks 224 and a fast network 107.

In one embodiment, the network 107 is in the form of the Internet. Other networks 107 or network-based environments can be used in other embodiments.

Figure 2:
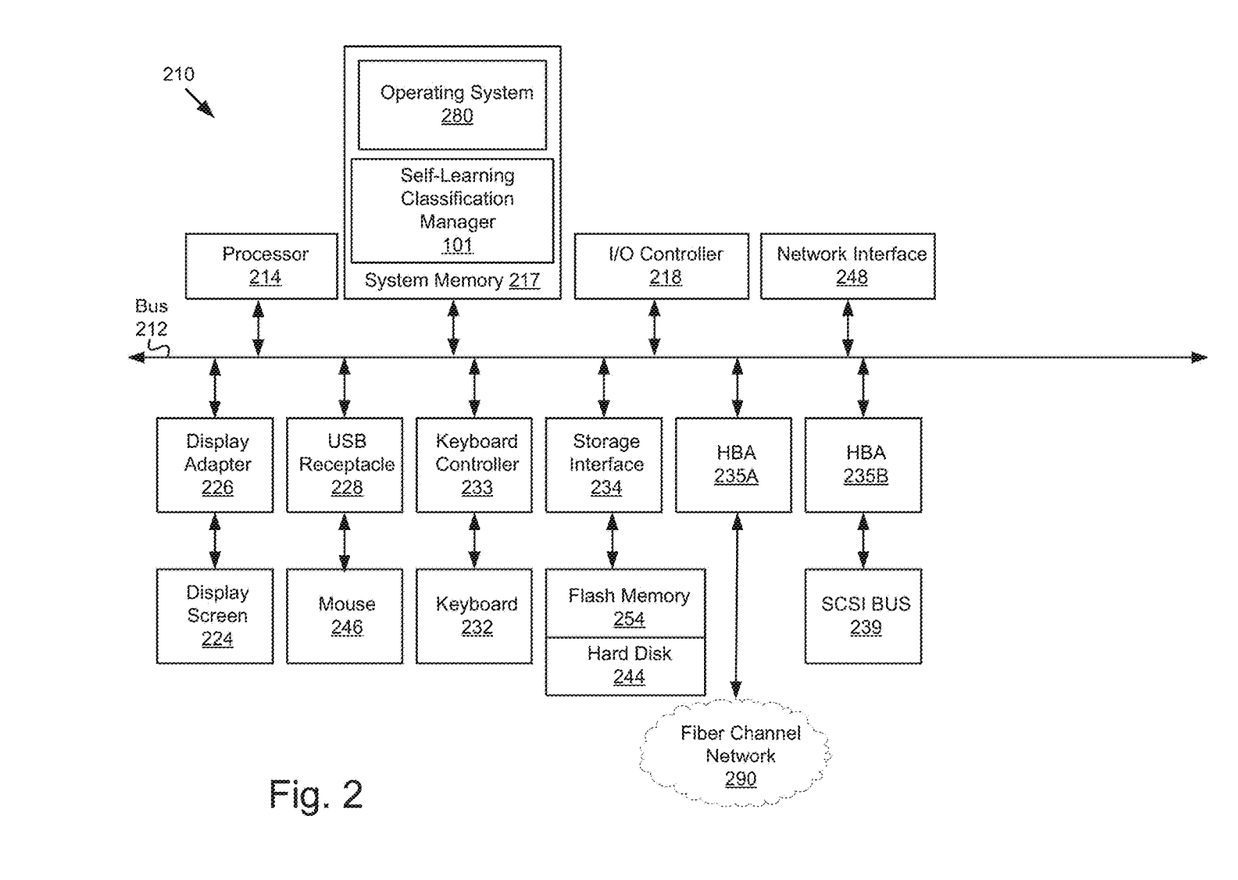
FIG. 2 shows an example computing device on which a self-learning classification manager resides, according to some embodiments.

FIG. 2 is a block diagram of a computing device 210 suitable for implementing a self-learning classification manager 101. As illustrated, one component of the computing device 210 is a bus 212. The bus 212 communicatively couples other components of the computing device 210, such as at least one processor 214, system memory 217 (e.g., random access memory (RAM), read-only memory (ROM), flash memory 254), an input/output (I/O) controller 218, a display adapter 226 communicatively coupled to a video output device such as a display screen 224, one or more interfaces such as Universal Serial Bus (USB) receptacles 228, a keyboard controller 233 communicatively coupled to a keyboard 232, a storage interface 234 communicatively coupled to one or more hard disk(s) 244 and/or solid state or other form(s) of storage media, a host bus adapter (HBA) interface card 235A configured to connect with a Fibre Channel (FC) network 290, an HBA interface card 235B configured to connect to a SCSI bus 239, and one or more wired and/or wireless network interface(s) 248 coupled, e.g., directly to bus 212.

Other components (not illustrated) may be connected in a similar manner. Conversely, all of the components illustrated in FIG. 2 need not be present. For example in embodiments in which the self-learning classification manager 101 is implemented on a access node or other type of programmable network appliance, components such as keyboard 232 and display screen 224 might not be present thereon, whereas in embodiments in which the self-learning classification manager 101 is implemented on a server computer 105, the server would typically include these components. In different embodiments, the various components of the computing device 210 can be interconnected in different ways from that shown in FIG. 2.

The bus 212 allows data communication between the processor 214 and system memory 217, which, as noted above may include ROM and/or flash memory 254 as well as RAM. The RAM is typically the main memory into which the operating system 280 and application programs are loaded. The ROM and/or flash memory 254 can contain, among other code, the Basic Input-Output system (BIOS) which controls certain basic hardware operations. Application programs can be stored on a local computer readable medium (e.g., hard disk 244, optical disk 242, flash memory 254) and loaded into system memory 217 and executed by the processor 214. Application programs can also be loaded into system memory 217 from a remote location (i.e., a remotely located computing device 210), for example via the network interface 248 or modem 247. In FIG. 2, the self-learning classification manager 101 is illustrated as residing in system memory 217. The workings of the self-learning classification manager 101 are explained in greater detail below in conjunction with FIG. 3. Also illustrated as residing in the system memory 217 is the operating system 280 of the computing device 210.

The storage interface 234 is coupled to one or more hard disks 244 and/or other storage media such as flash memory 254. The storage media may be a part of computing device 210, or may be physically separate and accessed through other interface systems.

The network interface 248 and/or modem 247 can be directly or indirectly communicatively coupled to a network 107 such as the Internet 109.

FIG. 3 illustrates another embodiment, in which a self-learning classification manager 101 runs on a server 105. It is to be understood that the functionalities of the self-learning classification manager 101 can be implemented on other computing devices 210 in other embodiments, or can be distributed between multiple computing devices 210, including within a cloud-based computing environment in which the functionality of the self-learning classification manager 101 is provided as a service over a network 107. It is to be understood that although the self-learning classification manager 101 is illustrated in FIG. 3 as a standalone entity, the illustrated self-learning classification manager 101 represents a collection of functionalities, which can be instantiated as a single or multiple modules on one or more computing devices 210 as desired. In FIGS. 3 and 4, the self-learning classification manager 101 is illustrated as being a separate component from a general purpose storage system 301. In some embodiments, the self-learning classification manager 101 is provided in conjunction with and/or as part of a cloud based and/or organization-level storage system 301.

It is to be understood the self-learning classification manager 101 can be instantiated as one or more modules (for example as object code or executable images) within the system memory 217 (e.g., RAM, ROM, flash memory 254) of any computing device 210, such that when the processor 214 of the computing device 210 processes a module, the computing device 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the self-learning classification manager 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

Turning now to FIG. 3, an exemplary storage architecture consists of a server 105 above a storage device 160 comprising hard disk storage 244 and flash storage 254. The server 105 can be in the form of any computing component utilized to serve access requests (e.g., read/GET, write/PUT, DELETE) made by applications 305 targeting stored objects 307 (e.g., files). The server 105 illustrated in FIG. 3 can be in the form of an access node, which can comprise, for example, a physical (hardware) or virtual (software) based load balancer or other entry point that provides an interface between requesting applications 305 and stored objects 307 (access nodes are sometimes referred to as "scaler" nodes or "scalers"). FIG. 3 illustrates a single server 105, but multiple access nodes can be deployed in different embodiments as desired. For clarity of illustration, the storage device 160 in FIG. 3 is illustrated as a single entity, but multiple physical and/or virtual storage devices 160 can be utilized in this capacity. FIG. 3 also illustrates flash storage 254 and hard disk storage 244, but other types of fast and/or slow storage media can be used in different embodiments. A requesting application 305 can direct any given access request to the server 105 to connect to the storage device 160. FIG. 3 illustrates a single requesting application 305 for clarity of explanation, but it is to be understood that multiple requesting applications 305 can interface with the server 105 as desired.

As new objects 307 are written to storage 160, the self-learning classification manager 101 classifies each object 307 according to one or more fields of metadata concerning the object 307. In this context, metadata can be any information about the object 307, such as its full path name or components thereof, its size, the name of the user or IP address from which the object 307 originated, etc. For each classified object 307, the self-learning classification manager 101 tracks its access history 303, and thus the frequency with which it is accessed and the duration of its lifetime on the storage 160. For example, the self-learning classification manager 101 can maintain two timestamps: the time at which the object 307 was initially written to storage 160, and the time the object 307 was last accessed (initially the two time timestamps are equal). Whenever a subsequent access or a delete occurs on an object 307, the previously stored time stamps can be used to calculate the time since-last access (for an access), or total lifetime (for a delete). Thus, the times between accesses and the total lifetime for each classified object 307 is tracked. The access history 303 for each object 307 can be stored as metadata of the object 307, or in a table or other suitable data structure or storage mechanism on the server 105, as illustrated in FIG. 3. In an embodiment in which a storage system 301 is initially deployed with the self-learning classification manager 101, each object 307 is classified and tracked from its initial entry into storage 160. In an embodiment in which the self-learning classification manager 101 is deployed on top of an existing storage system 301, the existing objects 307 already in storage 160 can also be classified and tracked, and corresponding access histories 303 created and maintained. In such an embodiment, newly added objects 307 are also classified upon entry into the storage system 301 and tracked.

By tracking access histories 303 for objects 307 that are classified according to multiple metadata fields, the self-learning classification manager 101 creates functional probability distributions for future access frequencies and lifetimes of objects 307 having the same or similar classification(s). As described in detail below, by amalgamating access histories 303 of objects 307 in the storage system 301 per multiple separate metadata fields, the access frequency and lifetime for new objects 307 added to the system can be automatically predicted, based on the historical access frequencies and lifetimes of objects 307 having classifications in common. When a new object 307 is initially written to the storage device 160, the self-learning classification manager 101 can predict its access frequency and lifetime based on other objects 307 with overlapping metadata fields. These predictions are made based on self-learning on access histories 303 of classified objects 307 in the storage system 301, without a need to pre-train the model before applying it in practice. As more access requests are processed for more objects 307, the self-learning occurs and the access predictions become more finely tuned. These predications can be used to assign new objects 307 to the best suited storage tier (e.g., hard disk 244 or flash storage 254). This allows each incoming object 307 to be written directly to slower or faster storage based on its predicted access frequency and storage lifetime.

Figure 5:
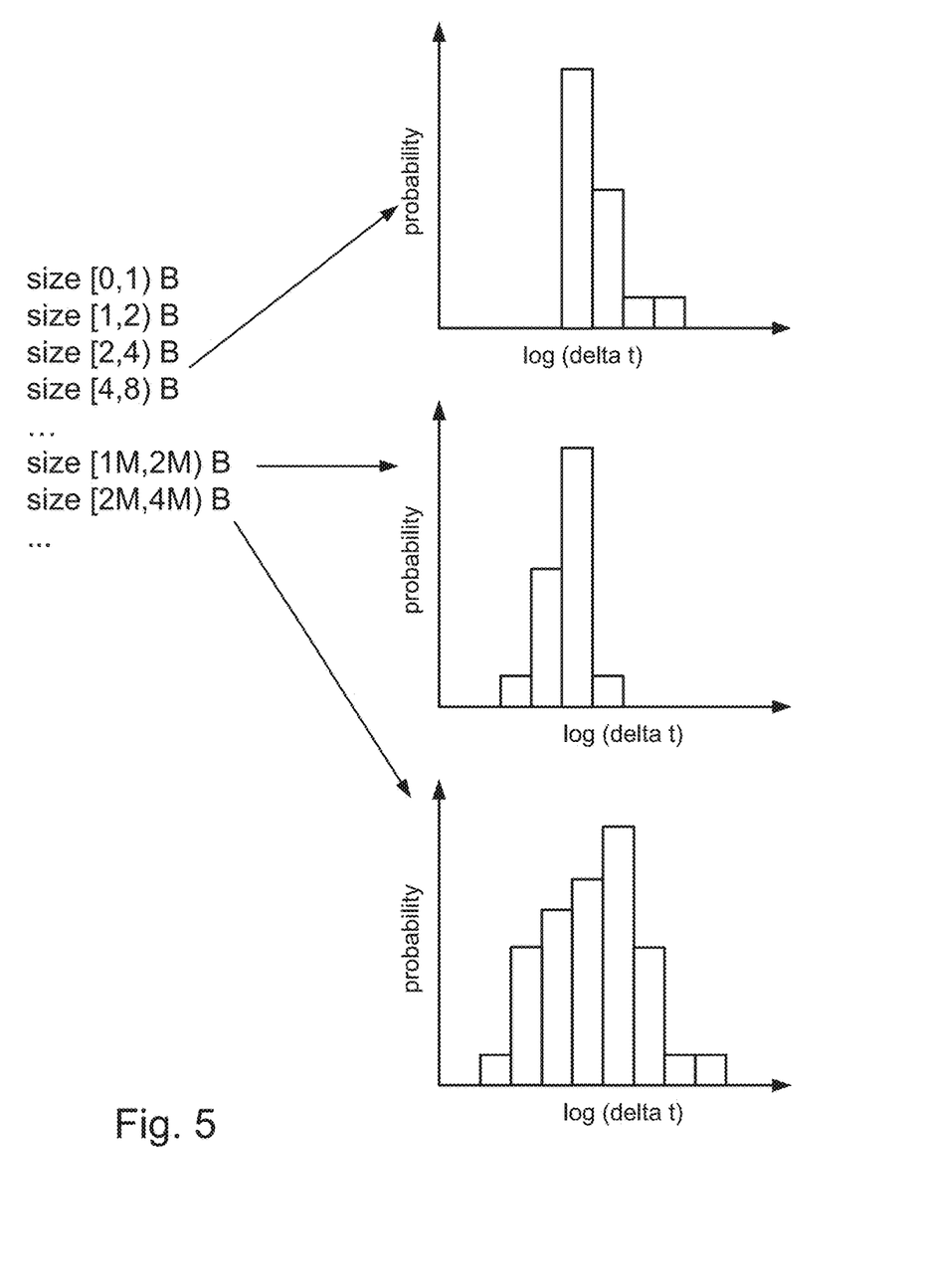
Figure 6:
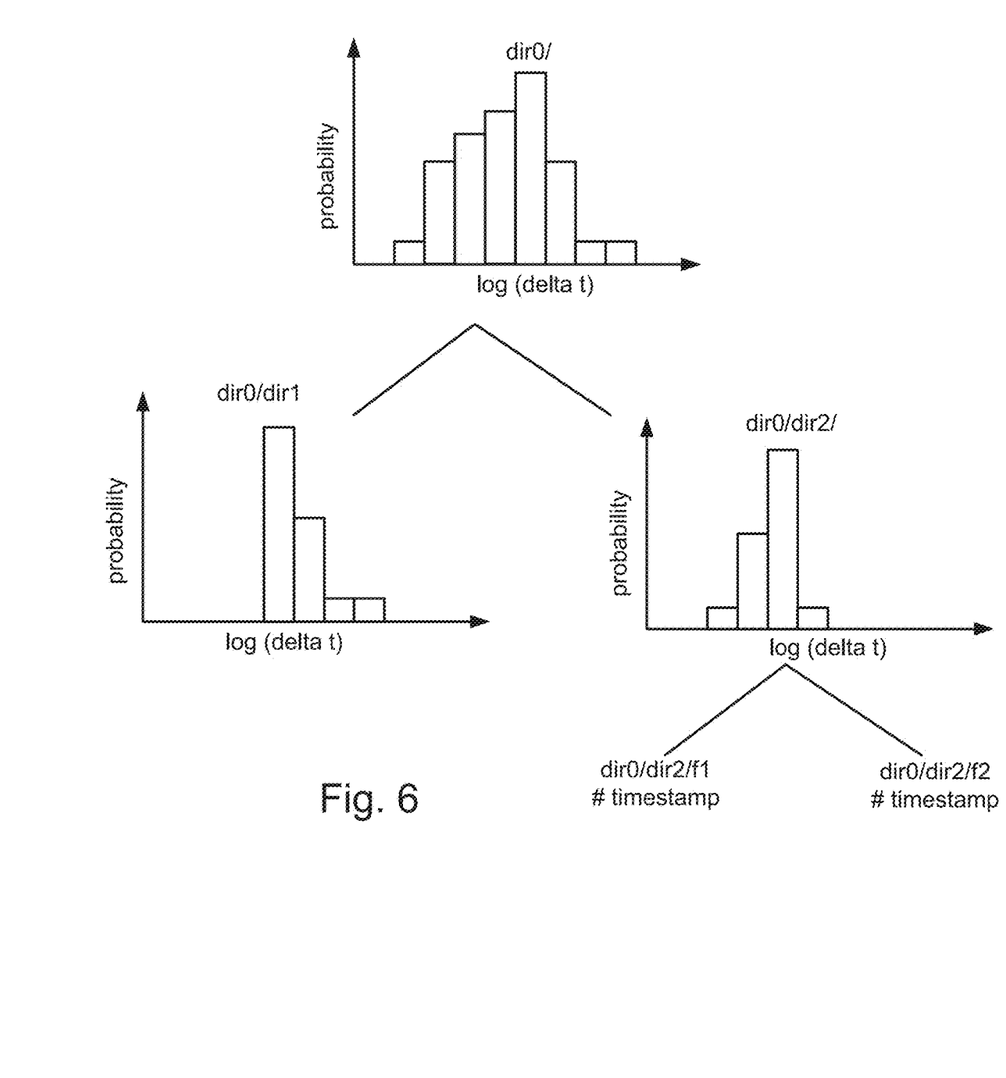

Some specific examples of classifying objects 307 according to example metadata fields and creating corresponding access histories 303 are provided herein in reference to FIGS. 4-6. It is to be understood that the metadata fields described in conjunction with FIGS. 4-6 are non-exhaustive examples only. Other examples of metadata fields according to which objects 307 can be classified are both possible and contemplated according to other embodiments. The classification of objects 307 according to different metadata fields can be at any desired level of granularity. In the embodiment described in conjunction with FIGS. 4-6, a specific design, format and implementation are utilized for maintaining and storing access histories 303. Other implementation mechanics and storage formats can be used for maintaining and storing access histories 303 in other embodiments.

As noted above, whenever an access event occurs targeting a specific stored object 307, the time since last access can be calculated (for a read, write or the like), or the lifetime of the object can be calculated (for a delete). In describing the example embodiment of FIGS. 4-6, the calculated times since last access and lifetimes are referred to collectively as delta t's. Other names can be used to describe this access history 303 information. In this embodiment, the self-learning classification manager 101 bins delta-t's together in logarithmic bins with, e.g., increment 2x. A logarithmic bin is referred to herein as a "log-delta-t." It is to be understood that the use of logarithmic bins is a specific storage implementation for access histories 303, and other formats are used for tracking access frequencies and lifetimes of objects 307 classified according to different metadata fields in other embodiments as desired.

Turning to FIG. 4, one metadata field according to which objects 307 can be classified is the name (or other identifier) of the user who initially wrote the object 307 to storage 160. For each given user name, the amalgamation of the access histories 303 for each object 307 initially stored by that user is tracked, for example in the probability distribution tables illustrated on FIG. 4. Each one of these tables stores an access probability distribution tracking how often certain log-delta-t's occur. When an object 307 that was initially stored by a specific user (e.g., "catherines") is accessed, the corresponding log-delta-t is added to corresponding distribution table. Thus, for each username that initially adds at least one object 307 to the storage system 301, a probability distribution table is maintained, amalgamating the access histories 303 of every object 307 added by that user. Whenever an access event occurs targeting such an object, the corresponding probability distribution table is updated to add the log-delta-t of the event (or increment that log-delta t if it is already in the table). In other words, the probability distribution table for "catherines" tracks which log-delta-t's have occurred concerning all objects 307 added by that user, and how many times each such log-delta-t has occurred. It is to be understood that other metadata fields identifying users can be tracked instead of or in addition to user name, such as IP address. In other words, log-delta-t's for the IP addresses (or other metadata fields) of users can be tracked in probability distribution tables similar to those of FIG. 4, but with user names replaced by IP address, or another metadata field identifying the user. Additionally or instead of tracking access probability distributions according to users who initially add objects 307 to the storage system 301, this historical access information can be tracked according to, for example, users who access existing objects 307. In different embodiments, access probability distributions based on amalgamated access histories 303 can be tracked and maintained using data structures and/or storage formats other than the probability distributions tables illustrated in FIGS. 4-6.

FIG. 5 illustrates probability distributions tables maintained based on another example tracked metadata field—the size of the accessed object 307. In this example, the log-delta-t's corresponding to access events are propagated to the probability distribution tables corresponding to the base-2 logarithm of the object size, expressed in bytes, as shown in FIG. 5. Thus, access probability distributions for objects 307 of different sizes are tracked.

Another specific example metadata field is shown in FIG. 6. Specifically, in this example, for each access request, the full path name of the target object 307 is parsed according to common delimiters such as "/" (forward slash), "-" (dash), "." (dot), ":" (colon), "\" (backslash), etc. This is used to parse the directory and file names in the path into a hierarchy, as show shown in FIG. 6 for objects 307 with the example full path names of "dir0/dir1/f1", "dir0/dir2/f1" and "dir0/dir2/f2". A separate access probability distribution is maintained for each node in this hierarchy, tracking log-delta-t's for the corresponding path component. When an access event occurs, the event is propagated up the hierarchy recursively on all nodes along the path from the node corresponding to the object name to the root node. For example, if the access event targets dir0/dir2/f2, the log-delta-t for the event would be added to nodes (recursively from bottom to top) dir0/dir2/f2, dir0/dir2 and dir0. Instead or in addition, log-delta-t's for events can be added to separate probability distribution tables for elements of a parsed full path name in a non-hierarchical manner.

It is to be understood that similar probability distribution tables can be maintained based on any other available metadata field as desired. Whenever an access event occurs, for each tracked metadata field the corresponding probability distribution tables are updated accordingly. Specific field values with less than a threshold number of counts can be periodically discarded as desired.

Figure 7:
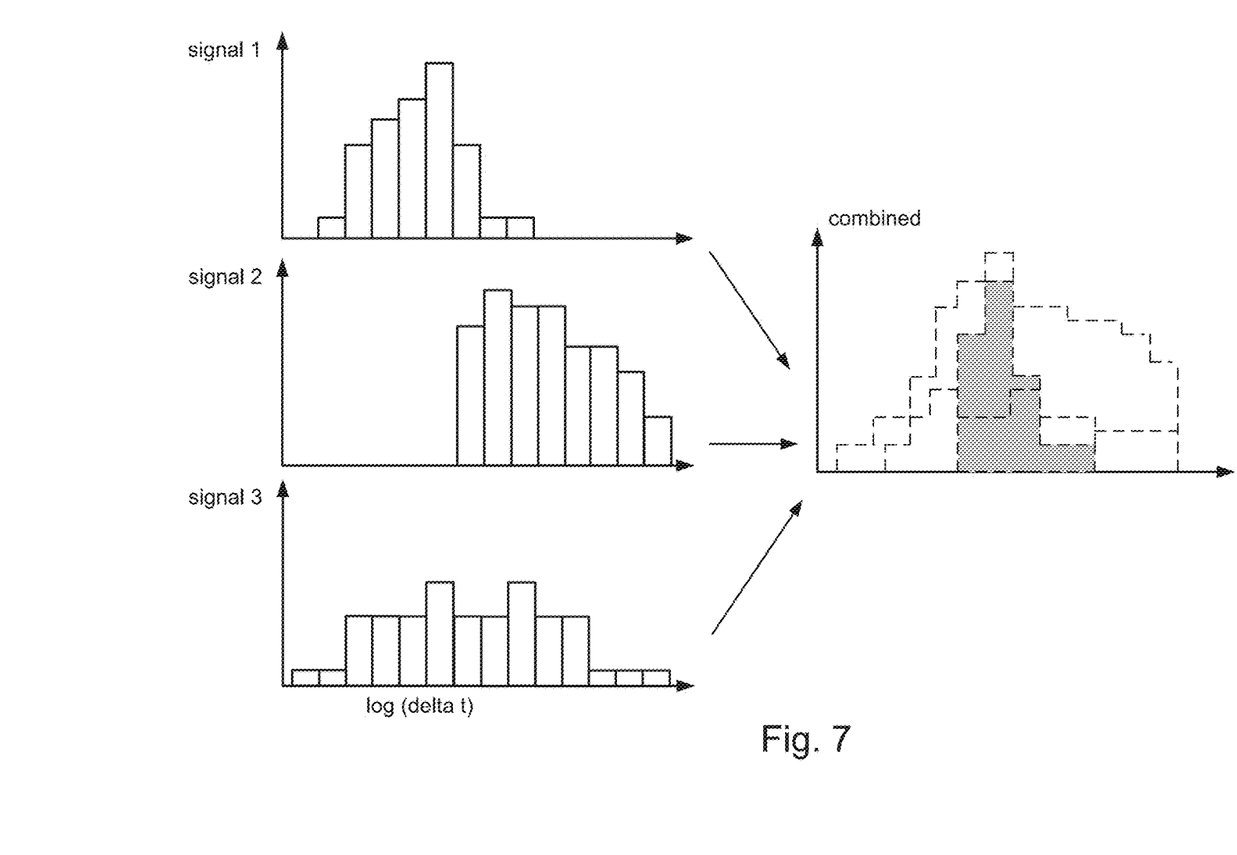
FIG. 7 illustrates combining signals corresponding to different metadata fields to generate a predicted access probability distribution for a given object, according to one embodiment.

Turning now to FIG. 7, an example of calculating a specific predicted access probability distribution for a given new object 307 being added to the storage system 301 is described, according to the embodiment described above in conjunction with FIG. 4-6. According to this embodiment, when a new object 307 is received by the storage system 301, the self-learning classification manager 101 inspects its metadata, and classifies the new object 307 according to multiple metadata fields for which access prediction distributions are tracked. For each such field, the corresponding prediction distribution table for objects 307 having the same field value is retrieved. For example, take the scenario in which the metadata fields according to which objects 307 are being classified are those described above in conjunction with FIGS. 4-6. In this example, the self-learning classification manager 101 would, for each given new object 307, 1) iterate upwards over the hierarchy tree for the object's full path name as described in FIG. 6, and retrieve the corresponding access probability distribution at each node up to the root, 2) retrieve the access probability distribution for the base-2 logarithm of the object's size, 3) retrieve the access probability distribution for the name of the corresponding user, and 4) retrieve any additional access probability distributions being tracked, such as IP address or the like.

Referring to each access probability distribution as a signal, the self-learning classification manager 101 combines the signals for the new object 307 into a single signal, which is treated as the access probability distribution for the new object 307. If any signal is missing, it can simply be omitted (for example, if there is no access history 301 for the given leaf node in the full path name). Any signal with fewer than a threshold number (e.g., 3, 10, 15) of counts may also be omitted. Once the signals are retrieved, the self-learning classification manager 101 can combine the signals by, e.g., calculating the point-wise product of all retrieved signals, which approximately corresponds to their overlap. This combined signal is then used as the predicted access probability distribution for the new object 307. This prediction is very robust. Signals which do not carry a lot of information automatically have a low weight in the overall result. Contradicting signals are handled gracefully, as this technique automatically finds a middle ground. Strong, narrow signals indicate a high level of confidence, and these automatically have a strong weight in the overall result, while not completely discarding the information of the weaker signals either. Statistical quantifications such as the mean, median, quantiles, etc. of predicted access probability distributions can be used as predictions for the mean, median, quantiles of the specific object's access frequency and life time. The median is a particularly robust indicator, while quantiles also provide a measure of confidence. It is to be understood that in different embodiments different techniques can be used to combine multiple access probability distributions (signals) into a predicted access probability distribution (combined signal) for a specific object 307. Additionally, which statistical indicators of a predicted access probability distribution to use to predict the access frequency and life time of a given object 307 are variable design parameters.

With the predicted lifetime and access frequency known, the self-learning classification manager 101 can assign the new object 307 to an appropriate storage tier. For example, if the storage device 160 has 10% flash storage and 90% hard disk storage, those objects 307 in the top 10% predicted access frequency can be assigned to and stored on flash, with the remaining 90% assigned to and stored on hard disks.

In one embodiment, any metadata field comprising personally identifiable information (PII) or other sensitive information can be anonymized. More specifically, metadata fields such as user names, IP addresses, object names, etc. can be replaced by cryptographically secure hashes of the original text. This does not affect the tracking of the access histories 303 or other parts of the process, and yields the same access predictions. It has the advantage that no personally identifiable information (PII) is ever persisted.

Such anonymization can even reduce memory usage. More specifically, replacing a signal by the sum of two signals causes the distribution to broaden. However, broad distributions do not significantly affect the outcome of the prediction. Hence if two signals were occasionally added to each other as a result of hash collisions, this would minimally affect the quality of the prediction, as this "error" would not dominate the large number of other signals present. Exploiting this, the hashes used for anonymization of specific metadata fields can be truncated, e.g., to fit in. a 32-bit number. The small number of resulting hash collisions would only minimally affect the prediction quality. A collision would result in two log-delta-t distributions being erroneously added to each other, but as explained above the added signals would not dominate the end result, and because of the other "correct" signals, would only result in a minimally degraded prediction.

In some embodiments, a specific memory and CPU efficient format is used to store the log-delta-t distributions. In practice, having only, e.g., 8 or 16 delta-t bins with a resolution of, e.g., 127 counts, is sufficient to make robust access predictions. Hence, only, e.g., 1 or 2 64-bit integer(s) are needed to store an entire log-delta-t distribution. Furthermore, updating such distribution can be done with only a few CPU cycles and without addressing the individual bins inside the 64-bit number.

Example C code for incrementing bin "B" of distribution "dist" (stored as 1 64-bit integer) is show in Table 1:

TABLE 1

```
dist += (1 << (B << 3));
if (dist | 0x8080808080808080 != 0){
    dist >>= 1;
    dist &= ~0x7070707070707070;
}
```

Referring to the C code in Table 1, the use of only additions, shifts and bitwise operations makes this operation extremely fast on modern CPUs. There is no need to iterate over arrays or use floating-point numbers.

The use of the format described above automatically gives more weight to recently learned observations, and automatically gives older observations less weight. As can be seen from the code example in Table 1, observations that are more than 128 updates old have their weight halved, those more than 256 updates old have their weight divided by 4, and so on. This further improves the prediction accuracy, as recent observations are more representative for future behavior, while not completely throwing away older knowledge either.

In some embodiments, the self-learning classification manager 101 is utilized in a distributed system. As the log-delta-t distributions accumulate information over a long period of time and over a large number of objects 307, it is acceptable for them to slightly lag behind. Hence, they can be asynchronously transferred between computing devices 210 in the distributed system. Only changes since the last transfer have to be transmitted, and there is no hard deadline on timing. Since timestamps are already maintained for objects 307, changes since the time of last transmit can be obtained.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in enough detail to enable the disclosed teachings to be practiced. Other embodiments may be used and derived therefrom, such that structural and logical substitutions and changes may be made without departing from the scope of this disclosure. The Detailed Description, therefore, is not to be taken in a limiting sense, and the scope of various embodiments is defined by the below claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The foregoing description, for the purpose of explanation, has been described with reference to specific example embodiments. The illustrative discussions above are not intended to be exhaustive or to limit the possible example embodiments to the precise forms disclosed. Many modifications and variations are possible in view of the above teachings. The example embodiments were chosen and described in order to best explain the principles involved and their practical applications, to thereby enable others to best utilize the various example embodiments with various modifications as are suited to the particular use contemplated.

Note that, although the terms "first," "second," and so forth may be used herein to describe various elements, these elements are not to be limited by these terms. These terms are only used to distinguish one element from another. For example, a first contact could be termed a second contact, and, similarly, a second contact could be termed a first contact, without departing from the scope of the present example embodiments. The first contact and the second contact are both contacts, but they are not the same contact.

The terminology used in the description of the example embodiments herein is for describing particular example embodiments only and is not intended to be limiting. As used in the description of the example embodiments and the appended claims, the singular forms "a," "an," and "the" are intended to include the plural forms as well, unless the context clearly indicates otherwise. Also note that the term "and/or" as used herein refers to and encompasses any and/or all possible combinations of one or more of the associated listed items. Furthermore, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As will be understood by those skilled in the art, the invention may be embodied in other specific forms without departing from the spirit or essential characteristics thereof. Likewise, the particular naming and division of the portions, modules, servers, managers, components, functions, procedures, actions, layers, features, attributes, methodologies, data structures and other aspects are not mandatory or significant, and the mechanisms that implement the invention or its features may have different names, divisions and/or formats. The foregoing description, for the purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer-implemented method comprising:
classifying a plurality of objects in a multi-tiered storage system according to multiple fields of metadata concerning the objects;
tracking access histories of the classified objects;
maintaining, for each specific classified object, a time at which the specific classified object was initially added to the multi-tiered storage system, and a time at which the specific classified object was last accessed;
amalgamating tracked access histories for objects having given values for given metadata fields, wherein access histories for all objects having a specific value for a specific metadata field are amalgamated;

determining access probability distributions for objects having given values for given metadata fields, based on the amalgamated access histories;

responsive to a new object being added to the multi-tiered storage system, classifying the new object according to multiple fields of metadata;

retrieving, for each specific one of the multiple metadata fields according to which the new object is classified, a determined access probability distribution for objects having a same metadata classification value as the new object;

determining a predicted access probability distribution for the new object, by combining the retrieved access probability distributions;

assigning the new object to a specific storage tier of the multi-tiered storage system based on the predicted access probability distribution for the new object; and storing the new object in the assigned storage tier.

2. The computer-implemented method of claim 1, wherein classifying the plurality of objects according to multiple fields of metadata concerning the objects comprises:

classifying the plurality of objects according to identifiers of users who initially added the objects to the multi-tiered storage system.

3. The computer-implemented method of claim 1, wherein classifying the plurality of objects according to multiple fields of metadata concerning the objects comprises:

classifying the plurality of objects according to identifiers of users who access the objects in the multi-tiered storage system.

4. The computer-implemented method of claim 1, wherein classifying the plurality of objects according to multiple fields of metadata concerning the objects comprises:

classifying the plurality of objects according to object size.

5. The computer-implemented method of claim 1, wherein classifying the plurality of objects according to multiple fields of metadata concerning the objects comprises:

classifying the plurality of objects according to object name.

6. The computer-implemented method of claim 1, wherein classifying the plurality of objects according to multiple fields of metadata concerning the objects comprises:

classifying the plurality of objects according to parsed components of object full path name.

7. The computer-implemented method of claim 1, further comprising:

classifying and tracking objects starting at times at which the objects are initially added to the multi-tiered storage system.

8. The computer-implemented method of claim 1, further comprising:

classifying and tracking objects already present in the multi-tiered storage system.

9. The computer-implemented method of claim 1, wherein tracking access histories of the classified objects further comprises:

tracking, for each specific classified object, times between accesses of the specific classified object in the multi-tiered storage system.

10. The computer-implemented method of claim 1, wherein tracking access histories of the classified objects further comprises:

tracking, for each specific classified object, a total lifetime of the specific classified object in the multi-tiered storage system.

11. The computer-implemented method of claim 1, wherein amalgamating tracked access histories for objects having given values for given metadata fields further comprises:

amalgamating tracked access activity for multiple objects having a same specific value for a specific metadata field in a corresponding logarithmic bin.

12. The computer-implemented method of claim 1, wherein amalgamating tracked access histories for objects having given values for given metadata fields further comprises:

responsive to an access event targeting an object having a specific value for a specific metadata field, updating a corresponding amalgamated tracked access history to account for the access event.

13. The computer-implemented method of claim 1, wherein determining access probability distributions for objects having given values for given metadata fields, based on the amalgamated access histories, further comprises:

maintaining multiple probability distribution tables, each separate maintained probability distribution table tracking access events for each classified object having a same specific value for a specific metadata field.

14. The computer-implemented method of claim 13, further comprising:

responsive to an access event targeting an object having a specific value for a specific metadata field, updating a corresponding maintained probability distribution table to account for the access event.

15. The computer-implemented method of claim 1, wherein determining a predicted access probability distribution for the new object, by combining the retrieved access probability distributions, further comprises:

calculating a point-wise product of all retrieved access probability distributions; and treating the calculated point-wise product as the predicted access probability distribution for the new object.

16. The computer-implemented method of claim 1, wherein assigning the new object to a specific storage tier of the multi-tiered storage system based on the predicted access probability distribution for the new object further comprises:

assigning the new object to a specific storage tier of the multi-tiered storage system based on at least one statistical quantifier of the predicted access probability distribution.

17. The computer-implemented method of claim 1, wherein assigning the new object to a specific storage tier of the multi-tiered storage system based on the predicted access probability distribution for the new object further comprises:

assigning the new object to a specific storage tier from a group of storage tiers consisting of solid state storage and electromechanical storage.

18. A computer-implemented multi-tiered storage system comprising:

a processor;
system memory;
an electromechanical storage;
a solid state storage;
an object classifying module residing in the system memory and configured to:

classify a plurality of objects in the multi-tiered storage system according to multiple fields of metadata concerning the objects; and
classify a new object according to multiple fields of metadata, responsive to the new object being added to the multi-tiered storage system;
an access history tracking module residing in the system memory and configured to:
track access histories of the classified objects; and
maintain, for each specific classified object, a time at which the specific classified object was initially added to the multi-tiered storage system, and a time at which the specific classified object was last accessed;
an amalgamating module residing in the system memory and configured to amalgamate tracked access histories for objects having given values for given metadata fields, wherein access histories for all objects having a specific value for a specific metadata field are amalgamated;
a retrieving module residing in the system memory and configured to, for each specific one of the multiple metadata fields according to which the new object is classified, retrieve a determined access probability distribution for objects having a same metadata classification value as the new object;
a determining module residing in the system memory and configured to determine a predicted access probability distribution for the new object, by combining the retrieved access probability distributions;
an assigning module residing in the system memory and configured to assign the new object to the solid state storage or to the electromechanical storage based on the predicted access probability distribution for the new object; and
a storing module residing in the system memory and configured to store the new object in the assigned storage.

19. The storage system of claim 18, wherein the access history tracking module is further configured to:

track, for each specific classified object, times between accesses of the specific classified object in the multi-tiered storage system.

20. A computer system comprising:
means for classifying a plurality of objects in a multi-tiered storage system according to multiple fields of metadata concerning the objects;
means for tracking access histories of the classified objects;
means for maintaining, for each specific classified object, a time at which the specific classified object was initially added to the multi-tiered storage system, and a time at which the specific classified object was last accessed;
means for amalgamating tracked access histories for objects having given values for given metadata fields, wherein access histories for all objects having a specific value for a specific metadata field are amalgamated;
means for determining access probability distributions for objects having given values for given metadata fields, based on the amalgamated access histories;
means for, responsive to a new object being added to the multi-tiered storage system, classifying the new object according to multiple fields of metadata;
means for retrieving, for each specific one of the multiple metadata fields according to which the new object is classified, a determined access probability distribution for objects having a same metadata classification value as the new object;
means for determining a predicted access probability distribution for the new object, by combining the retrieved access probability distributions;
means for assigning the new object to a specific storage tier of the multi-tiered storage system based on the predicted access probability distribution for the new object; and
means for storing the new object in the assigned storage tier.

* * * * *